United States Patent [19]

McIntyre et al.

[11] Patent Number: 4,687,936

[45] Date of Patent: Aug. 18, 1987

[54] IN-LINE BEAM SCANNING SYSTEM

[75] Inventors: Raymond D. McIntyre, Los Altos Hills; Karl L. Brown, Menlo Park, both of Calif.

[73] Assignee: Varian Associates, Inc., Palo Alto, Calif.

[21] Appl. No.: 810,398

[22] Filed: Dec. 17, 1985

Related U.S. Application Data

[63] Continuation-in-part of Ser. No. 754,033, Jul. 11, 1985, abandoned.

[51] Int. Cl.[4] .......... G01K 1/08; H01J 3/14

[52] U.S. Cl. .......... 250/397; 250/396 R; 250/396 ML

[58] Field of Search .......... 250/292, 296, 297, 300, 250/396 R, 396 ML, 397, 398

[56] References Cited

U.S. PATENT DOCUMENTS

| | | | |
|---|---|---|---|
| 3,138,706 | 6/1964 | Brown et al. | 250/41.9 |
| 3,193,717 | 7/1965 | Nunan | 313/76 |
| 3,287,584 | 11/1966 | Pinel | 250/398 |
| 3,405,363 | 10/1968 | Brown | 328/230 |
| 3,691,374 | 9/1972 | Leboutet | 250/49.5 D |
| 3,749,964 | 7/1973 | Hirata | 250/398 |
| 3,838,284 | 9/1974 | McIntyre et al. | 250/385 |
| 3,857,090 | 12/1974 | Chick | 250/397 |
| 3,952,198 | 4/1976 | Harada et al. | 250/396 ML |
| 3,979,590 | 9/1976 | Andersen | 250/305 |
| 4,063,098 | 12/1977 | Enge | 250/396 |
| 4,075,488 | 2/1978 | Okayama et al. | 250/396 |
| 4,078,176 | 3/1978 | Matsuda | 250/296 |
| 4,191,887 | 3/1980 | Brown | 250/396 ML |
| 4,198,565 | 4/1980 | Ono | 250/399 |

*Primary Examiner*—Bruce C. Anderson
*Attorney, Agent, or Firm*—Stanley Z. Cole; Gerald M. Fisher; Kenneth L. Warsh

[57] ABSTRACT

A system for scanning a beam of charged-particles across a target is described which compensates for energy dispersion in the beam. A time-varying magnet with circular pole pieces is used to sweep the beam left to right. Two wedge-shaped magnet dipoles, one on each side of the center line are used to bend the beam parallel to the center line and compensate for beam energy dispersion.

7 Claims, 11 Drawing Figures

IN-LINE BEAM SCANNING SYSTEM

This a continuation in part of U.S. patent application Ser. No. 754,033 filed July 11, 1985 abandoned.

FIELD OF THE INVENTION

This invention relates to a system for scanning a charged-particle beam in an in-line arrangement, and at the same time for providing compensation for chromatic dispersion due to any energy spectrum width in the source beam. The invention also provides a means for monitoring and control of the source beam energy.

BACKGROUND OF THE INVENTION

In some applications of scanned charged-particle beams, e.g., the use of scanned electron beams to sterilize materials, uniformity of charge deposition and a predictable beam energy are both important in order to achieve effective and efficient treatment of the material being irradiated. Loss of charge deposition or irradiation dose uniformity will occur if energy dispersion is uncorrected. Uncertainty in the depth of deposition will occur if beam energy is not monitored and controlled.

In the prior art, irradiation of material by an electron beam from a microwave electron linear accelerator, has been achieved by the use of a 90 degree bend magnet, in addition to a scanning dipole. U.S. Pat. No. 3,193,717 to Nunan, assigned in common with this patent, discloses apparatus for scanning a beam using a 90° magnet followed by a scanning dipole. U.S Pat. No. 4,063,098 to H. A. Enge, discloses a quadrupole magnet after a scan magnet and a bending magnet and before the articles to be irradiated. The quadrupole magnet of the Enge patent compensates for the energy dispersion of scanned charged particles. This quadrupole magnet is asymmetric, with a relatively narrow gap between those poles through which the higher momentum particles pass, to compensate for the dispersion effect which occurs in the scanning process. A symmetric quadrupole would compensate for deflection dispersion only, but the asymmetric structure compensates both for the deflection and scanning dispersion. Both the Enge apparatus and the Nunan apparatus are bulky and expensive because they require separate bending, scanning and focussing devices.

Some scanners of the prior art used divergent scanned beams. If the irradiated subject is being moved across the divergent beam in the bend plane, an averaging takes place which eliminates adverse effects of the divergent beam. Where the irradiated subject is being moved across the beam in the direction transverse to the bend plane, the divergent beam causes problems of uneven dosage across the target and ineffecient use of the beam at the edges of the scan.

OBJECT OF THE INVENTION

It is the object of this invention to provide an apparatus for scanning a beam of charged particles which eliminates the use of an additional bending magnet, thereby reducing the size and cost of the apparatus.

A further object of the invention is to provide a scanning apparatus such that there is no momentum dispersion of beam energy in the scanned beam at the target, so that irradiation dose uniformity can be easily achieved.

Another object of the invention is to provide a scanning apparatus such that the scanned beam are parallel and non-divergent as they strike the target to assure uniformity at the edges of the scanned beam.

SUMMARY OF THE INVENTION

This invention provides for a system in which energy determination of the beam may be achieved without use of an additional bend magnet, and where spectrum compensation of the scanner beam is achieved by use of a pair of wedge-shaped dipoles placed over the beam path. A time-varying magnetic field is used to sweep the beam to the left and right of the centerline. The dipole magnets symmetrically placed on either side of the centerline then turns the beam in a direction parallel to the centerline and also compensates for energy spread. Various configurations of ionization detectors or beam collectors can be used to control the energy of the accelerator in conjunction with the magnet system described here.

These and further operational and constructional characteristics of the invention will be more evident from the detailed description given hereinafter with reference to the figures of the accompanying drawings which illustrate preferred embodiments and alternatives by way of non-limiting examples.

DESCRIPTION OF THE PREFERRED EMBODIMENTS

Figures 1A, 1B:
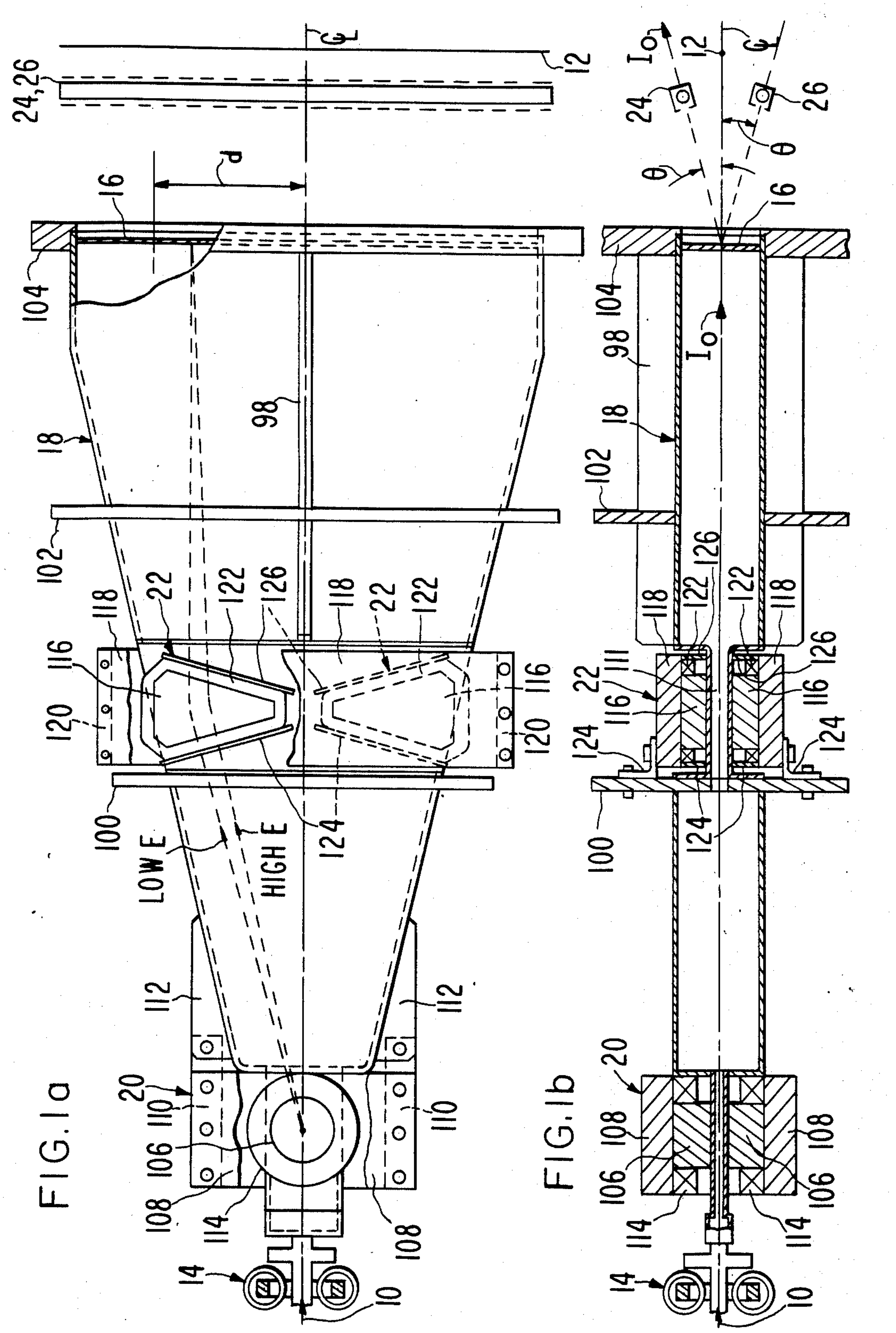
FIG. 1*a* shows a plan view of the system in the preferred embodiment.
FIG. 1*b* shows a sectional view through the center line of FIG. 1*a* aligned with FIG. 1*a*.

Referring now to the drawings wherein reference numerals are used to designate parts throughout the various figures thereof, there is shown in FIGS. 1*a* and 1*b* a beam of charged-particles 10, at average energy E, being injected into the subject invention for the purpose of being scanned in a central plane through line 12 onto a target or material to be irradiated. The beam pulse amplitude is monitored by toroid 14. The beam is then scanned in a bend plane across an output window 16, located on the scanned vacuum chamber 18. The beam is scanned within the bend plane by a time-varying magnetic field in the scanning dipole 20, and then deflected back within the bend plane, approximately parallel to centerline, by a pair of wedge-shaped dipoles 22, located symmetrically about centerline. Energy dispersion in the bend plane is compensated for by the wedge geometry which provides increasing integral of Bd1 with increasing scan angle. At the same time, defocussing action in the non-bend direction transverse to the bend plane is minimized by use of the circular crosssection pole for the scanning dipole 20, and a wedge angle that produces 90 degrees interception (or close to it) between field edges of the wedge-shaped dipoles 22 and the beam. There is no net focusing for defocusing action in the non-bend direction when a beam enters or exits perpendicularly to a pole face of a dipole magnet, except for the effects caused by the finite extent of the fringing fields.

Detection of beam energy can be accomplished by a number of alternative schemes. FIGS. 1*a*, 1*b* illustrate the use of a pair of ion chambers 24 and 26, located symmetrically about the scanner centerline, and positioned in the transverse plane away from the main beam path, but close enough to it to intercept peripheral electrons scattered from the output window. The output window is chosen largely for strength and thermal conductivity. A typical window would be made of 16 mil aluminum or titanium. Each ion chamber is shielded from other sources of scattered electrons, e.g., material or products being irradiated beyond the window by the scanned beam. The scattered electron beam intensity, $I(E)_\theta$, normalized to the incoming beam of amplitude $I_o$ incident on the window, scattered into an angle theta from centerline, is a function of electron energy E incident on the window, according to the relationship: $I(E)_\theta = F(\theta, I_o)\ \mathrm{EXP}\ (-kE)$ where k is dependent on the material and the thickness of the window and F is a function of $I_o$ and $\theta$. The normalized ionization intensity at the ion chamber will therefore be a function of the beam energy. Ion chambers 24 and 26 are designed to physically cover the maximum scan width (2*d*), so that ionization intensity will not be a function of beam position along the scan path. Two chambers are used, and the signal from them averaged to further minimize variations in signal due to any changes in beam position in the transverse plane. Each ion chamber is maintained within an unsaturated condition by the appropriate use of local attenuation or shielding positioned between the chamber and the scanner window.

Figure 3A:
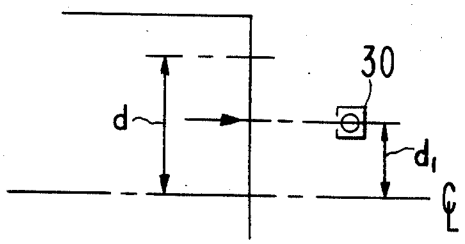
FIG. 3*a* shows a plan view of the charged-particle beam detector in a second alternate embodiment.
Figure 2A:
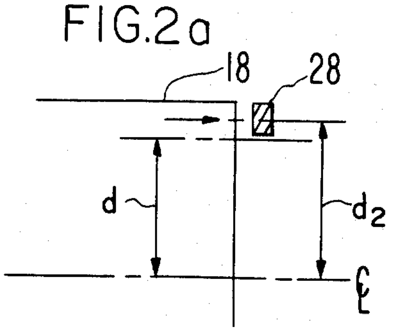
FIG. 2*a* shows a plan view of the charged-particle beam detector in an alternate embodiment.
Figure 3B:
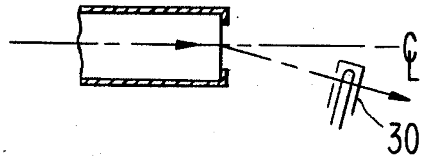
FIG. 3*b* shows a sectional view of the embodiment of FIG. 3*a* and aligned with FIG. 3*a*.
Figure 2B:
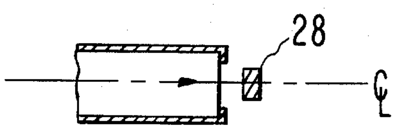
FIG. 2*b* shows a sectional view of the embodiment of FIG. 2*a* along the center line of FIG. 2*a* and aligned with FIG. 2*a*.
Figure 5:
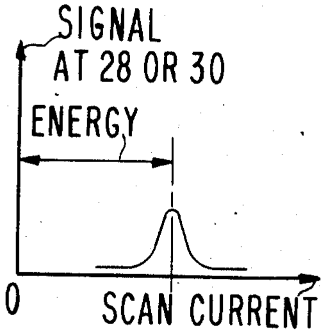
FIG. 5 shows the plot of signal detected from the beam for the embodiments of FIGS. 2 or 3 as a function of scan current.

FIGS. 2,3 illustrate alternative energy monitoring methods. Both methods sample beam intensity at a single point along the scan path. In FIGS. 2*a* and 2*b*, the full beam is intercepted by a water-cooled collector 28 placed in or out of the vacuum chamber 18. Alternatively, in FIGS. 3*a* and 3*b* the detector is an ion chamber 30 placed away from the scan-plane but close enough to the beam path to detect scattered electrons from the window 16, without intercepting the main beam. Collector 28 is placed at d(2), beyond the normal maximum scan range (d), as shown in FIG. 2*a*, whereas the ion chamber 30 is placed at some scan offset d(1) from centerline, where d(1) is equal to or greater than the minimum scan range, and less than d. Collector 28, which could be placed in vacuum, could also be placed between the scan dipole 20 and the wedge-shaped dipoles 22 such that it is put beyond the normal scan range. When collector 28 is used, the scan current to dipole 20 is periodically increased during a single scan, sufficient to ensure interception of beam by the collector 28. In both schemes, the output from the collector 28 or from the ion chamber 30, can be applied to an oscilloscope with horizontal deflection driven by a signal proportional to the scan current in magnet 20, which in turn can be calibrated in terms of the beam energy. The position of the signal from 28 or 30 will therefore indicate average beam energy as shown in FIG. 5. This same information can also be processed in conventional digital circuitry to provide the basis for a servo to maintain a constant beam energy.

Figure 4:
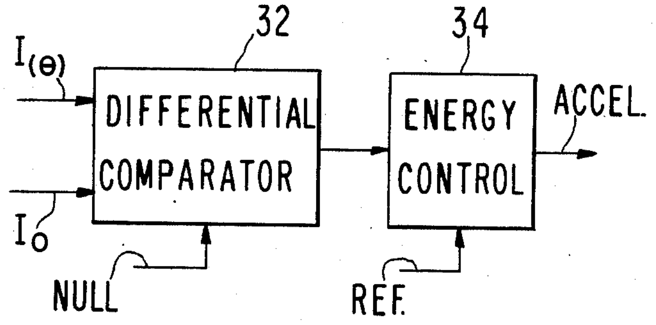
FIG. 4 shows a schematic diagram of the energy control circuit used with the preferred embodiment of FIGS. 1*a*, 1*b*.

FIG. 4 illustrates the associated energy control scheme for the preferred embodiment of FIGS. 1*a*, 1*b*. The averaged signal $I(\theta)$) from ion chambers 24, 26 is applied to a differential comparator 32, and normalized against a signal proportional to beam pulse current, into the scanner, as derived from toroid 14. Output of the comparator is adjusted to zero at the desired operating energy, by a reference input signal, labelled NULL. Energy changes result in an output signal from the comparator that is applied to an energy control circuit 34 for the accelerator. For example, this could be control of inut voltage to the microwave source for the accelerator. Energy is set to a reference level and then servo-controlled to maintain this level by changes sensed in ion chambers 24 and 26.

In detail, the vacuum chamber 18 is fabricated of welded 3/32 inch thick type 304 stainless-steel, aluminum or other non-magnetic material. In the region between the scan dipoles 106, non-magnetic stainless steel is prefered in order to minimize eddy current losses and field distortion. Support flanges 98, 100, 102 and 104 are used to mount the apparatus as part of a larger installation. The scanning dipole 20 is made from two pole pieces 106 of circular cross-section attached to top and bottom yoke pieces 108 and side yoke pieces 110. The pole pieces 106 and yoke pieces 108, 110 are made of magnetic material such a cold-rolled steel or from trnsformer laminations to minimize eddy current losses. Support flanges 110, welded to the vacuum chamber 18, are attached to the side yoke pieces 112 with bolts for physical support. Two coils 114 are used to generate the magnetic field in the scanning magnet 20.

The wedge-shaped dipoles 22 are fabricated of four pole pieces 116. There are top and bottom yoke pieces 118 and side yoke pieces 120. The pole pieces 116 and yoke pieces are magnetic material such as cold-rolled steel. Four coils 120 are used to generate the magnetic field in the wedge-shaped dipoles 22. Brackets 124 are used to attach the wedge-shaped dipoles 22 to the support flange 100 with bolts.

Magnetic field clamps 124 of mild steel are used outside the coils 122 to reduce fringing field effects.

Figure 6:
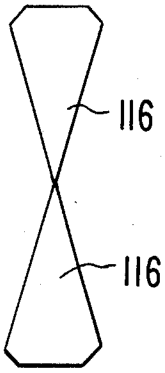
FIG. 6 shows a schematic cross-section of the wedge-shaped dipoles.
Figure 7:
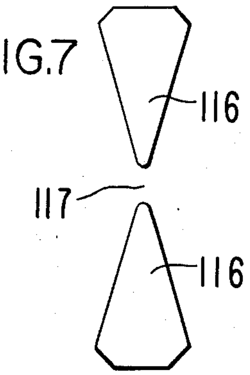
FIG. 7 shows a schematic cross-section of the wedge-shaped dipoles with apexes removed.

As shown in FIG. 1a, the pole pieces 116 of the wedge-shaped dipoles 22 have their sharp corners removed to reduce unwanted fringing field effects. In FIG. 6 the pole pieces 116 are shown with the apexes left on and positioned so that the pole pieces touch at the center line of the apparatus. This creates a problem where the pole pieces touch because the direction of the fields are opposite. A "magnetic short" is created if the pole pieces are allowed to touch. In order to eliminate this problem, the apexes are removed as shown in FIG. 7, creating a gap 117 which is at least as large as the dipole gap 111.

Figure 8:
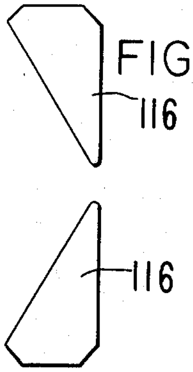
FIG. 8 shows a schematic cross-section of the wedge-shaped dipoles in an alternate embodiment.

Other embodiments of wedge-shaped dipoles, as shown for example in FIG. 8, are also advantageous. Such alternate embodiments can be used to further reduce dispersion in the bend-plane or the transverse plane. Higher order corrections to dispersion can be made by using curved pole edges on the wedge-shaped dipoles if desired.

In designing the system, a candidate geometry as shown in FIG. 1 is specified. This candidate geometry is used as input to the computer program TRANSPORT which is then used to optimize the final geometry. (See Brown et al, TRANSPORT: A Computer Program for Designing Charged Particle Beam Transport Systems, SLAC-91, available from National Technical Information Service, U.S. Dept. of Commerce, 5285 Port Royal Road, Springfield, Va. 22151.)

This invention is not limited to the preferred embodiments heretofore described, to which variations and improvements may be made, without leaving the scope of protection of the present patent, the characteristics of which are summarized in the following claims.

What is claimed is:

1. A system for scanning a charged-particle beam along a scan path and controlling the energy of the beam comprising:

a means for detecting a charged-particle beam pulse amplitude as the beam passes along a first line;

a means for imposing a time-varying magnetic dipole field across a charged-particles beam after the beam has passed through said means for detecting a beam pulse amplitude, whereby the beam can be deflected in a beam plane to either side of the first line;

a means for imposing a time-fixed dipole magnetic field on the beam after the beam has passed through said means for imposing a time-varying magnetic field, said means for imposing a time-fixed dipole magnetic field including means for imposing a first and a second wedge-shaped regions of magnetic field perpendicular to said beam plane, said first wedge-shaped region of magnetic field being of opposite polarity to said second wedge-shaped region of magnetic field, said first and second wedge-shaped regions of magnetic field being symmetrically positioned on either side of the first line whereby the beam direction or energy dispersion introduced at said means for imposing a time-varying magnetic dipole field is offset by focussing in said wedge-shaped regions of magnetic field;

charged-particle detector means located along the path of the beam after passing through the time-fixed magnetic dipole field; and signal processing means for comparing a signal from said charged-particle detector means to a signal from said means for detecting a charged-particle pulse amplitude whereby the output from said signal processing means is used to control beam energy.

2. A system as in claim 1 wherein said charged-particle detector means includes matched pairs of charged-particle detector means located equidistant and symmetrically on either side of the beam plane and said signal processing means compares an average signal from said matched pairs of charged-particle detector means to a signal from means for detecting a charged-particle pulse amplitude.

3. A system as in claim 2 wherein said pairs of charged-particle detector means cover a maximum scan width of the ion beam whereby to prevent said signal from said charged-particle detector means from being a function of beam position along said scan path.

4. A system for scanning a charged-particle beam along a scan path and controlling the energy of the beam comprising:

a means for detecting a charged-particle beam pulse amplitude as the beam passes along a first line;

a means for imposing a time-varying magnetic dipole field across a charged-particle beam after the beam has passed through said means for detecting a beam pulse amplitude, whereby the beam can be deflected in a beam plane to either side of the first line;

a means for imposing a time-fixed dipole magnetic field on the beam after the beam has passed through said means for imposing a time-varying magnetic field, said means for imposing a time-fixed dipole magnetic field including means for imposing a first and a second wedged-shaped regions of magnetic field of perpendicular to said beam plane, said first wedge-shaped region of magnetic field being of opposite polarity to said second wedge-shaped region of magnetic field, said first and second wedge-shaped regions of magnetic field being symmetrically positioned on either side of the first line whereby the beam direction or energy dispersion introduced at said means for imposing a time-varying magnetic dipole field is offset by focussing in said wedge-shaped regions of magnetic field;

charged-particle detector means located along the path of the beam after passing through the time-fixed magnetic dipole field; and signal processing means for comparing a signal from said charged-particle detector means to a signal from said means for imposing a time-varying magnetic dipole field whereby the output from said signal processing means is used to control beam energy.

5. A system as in claim 4 wherein said charged-particle detector means includes a charged-particle collector located in the scan plane but outside a normal scan range and wherein a signal from said charged-particle collector is obtained by momentarily extending the scan range and wherein said signal processing means compares the timing of a signal from said charged-particle collector to said signal from said means for imposing a time-varying magnetic dipole field.

6. A system as in claim 4 wherein said charged-particle detector means includes a charged-particle detector located within the normal scan range and outside the scan plane and wherein said signal processing means compares the timing of a signal from said charged-particle detector to said signal from said means for imposing a time-varying magnetic dipole field.

7. A system for scanning a charged-particle beam along a scan path comprising:

a means for imposing a time-varying magnetic dipole field across a charged-particle beam after the beam has passed through a means for detecting a beam pulse amplitude, whereby the beam can be deflected in a beam plane to either side of the first line; and a means for imposing a time-fixed dipole magnetic field on the beam after the beam has passed through said means of imposing a time-varying magnetic field, said means for imposing a time-fixed dipole magnetic field including means for imposing a first and a second wedge-shaped regions of magnetic field perpendicular to said beam plane, said first wedge-shaped region of magnetic field being of opposite polarity to said second wedge-shaped region of magnetic field, said first and second wedge-shaped region of magnetic field being symmetrically positioned on either side of the first line whereby the beam direction or energy dispersion introduced at said means for imposing a time-varying magnetic dipole field is offset by focussing in said wedge-shaped regions of magnetic field.

* * * * *